US00H002200H

(19) United States

(12) Statutory Invention Registration

Horton et al.

(10) Reg. No.: US H2200 H

(43) Published: Sep. 4, 2007

(54) BABY BOTTLE

(75) Inventors: Thomas C. Horton, Newburgh, IN (US); Joseph E. Schultheis, Evansville, IN (US)

(73) Assignee: Bristol-Myers Squibb Company, Princeton, NJ (US)

(21) Appl. No.: 29/242,745

(22) Filed: Nov. 14, 2005

(51) LOC (8) Cl. ..... 07-01

(52) U.S. Cl. ..... D24/197

(58) Field of Classification Search ..... D24/193–99, D24/215; D7/393–4; D9/436, 456, 526; 215/11.1–11.6, 215/387, 392; 248/102–7

See application file for complete search history.

(56) References Cited

U.S. PATENT DOCUMENTS

| | | | | | |
|---|---|---|---|---|---|
| 1,610,136 | A | | 12/1926 | Kelty | 215/11.1 |
| 1,947,753 | A | | 2/1934 | Block | 215/11.1 |
| D99,270 | S | | 4/1936 | Dache-Despres | |
| D105,669 | S | | 8/1937 | Mills | |
| D189,373 | S | | 11/1960 | Lerner | D58/8 |
| D198,870 | S | | 8/1964 | Hedgecock | D58/8 |
| 3,145,867 | A | | 8/1964 | Roberts et al. | 215/11.1 |
| 3,162,318 | A | | 12/1964 | Woodbury, Jr. | 215/11 |
| D202,003 | S | | 8/1965 | Douglas | D58/17 |
| 3,232,467 | A | * | 2/1966 | Barton | 215/11.3 |
| 3,243,069 | A | | 3/1966 | Duerme | 215/11 |
| D209,715 | S | | 12/1967 | Ninesling et al. | D58/8 |
| D218,148 | S | | 7/1970 | Noyes et al. | D9/118 |
| 3,645,262 | A | | 2/1972 | Harrigan | 604/77 |
| D223,438 | S | | 4/1972 | Lluch | D9/169 |
| D225,212 | S | | 11/1972 | Mandiargues | D9/169 |
| 3,746,198 | A | | 7/1973 | Howland | 215/11.1 |
| D228,694 | S | * | 10/1973 | Ritsi | D24/197 |
| D230,256 | S | | 2/1974 | Ckola | D9/102 |

(Continued)

FOREIGN PATENT DOCUMENTS

| | | | |
|---|---|---|---|
| FR | 2576686 | 8/1986 | 215/11.1 |
| WO | WO 88/04261 | 6/1988 | |

*Primary Examiner*—Michelle Clement

(74) *Attorney, Agent, or Firm*—Nelson Mullins Riley & Scarborough, LLP

(57) CLAIM

The ornamental design for a baby bottle, as shown and described.

DESCRIPTION

Figure 1:
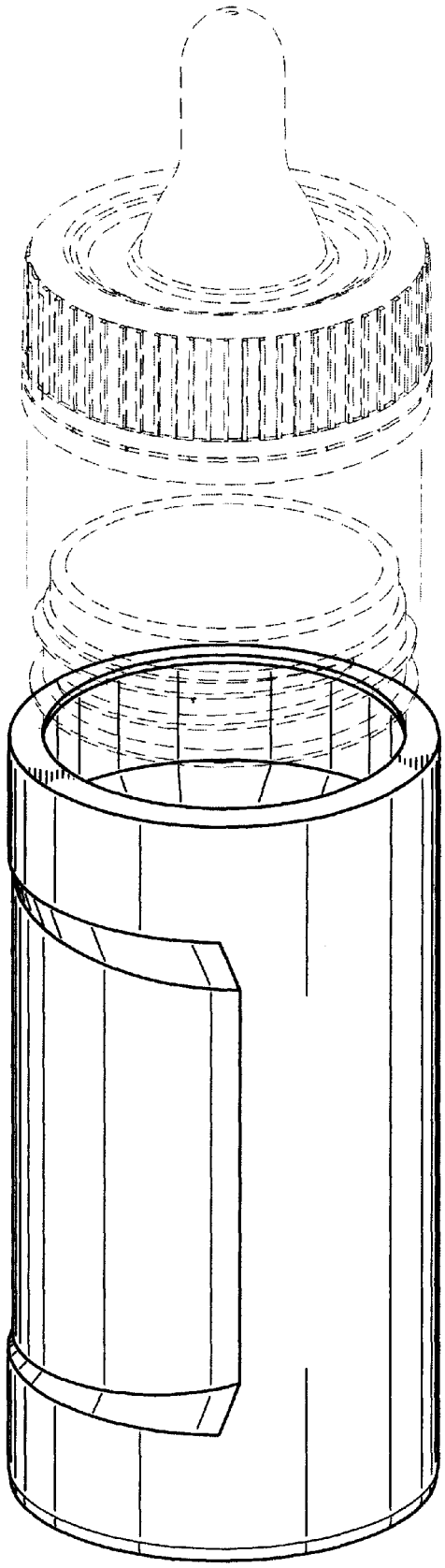
FIG. 1 is a perspective view of a baby bottle embodying the design of the present invention.
Figure 2:
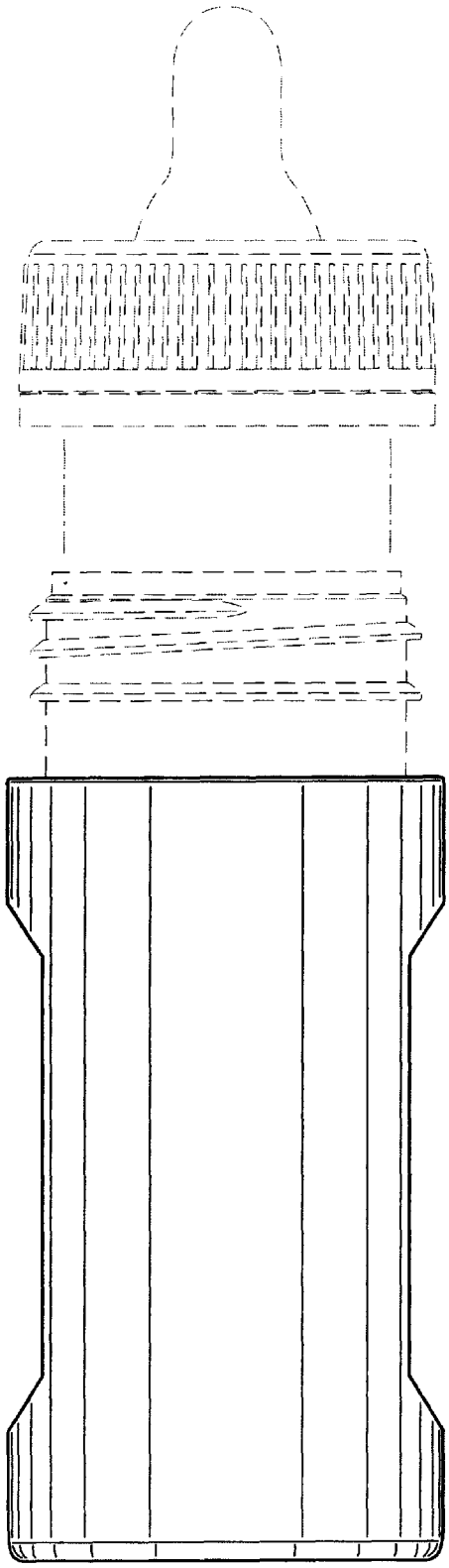
FIG. 2 is a front elevational view of the baby bottle illustrated in FIG. 1.
Figure 3:
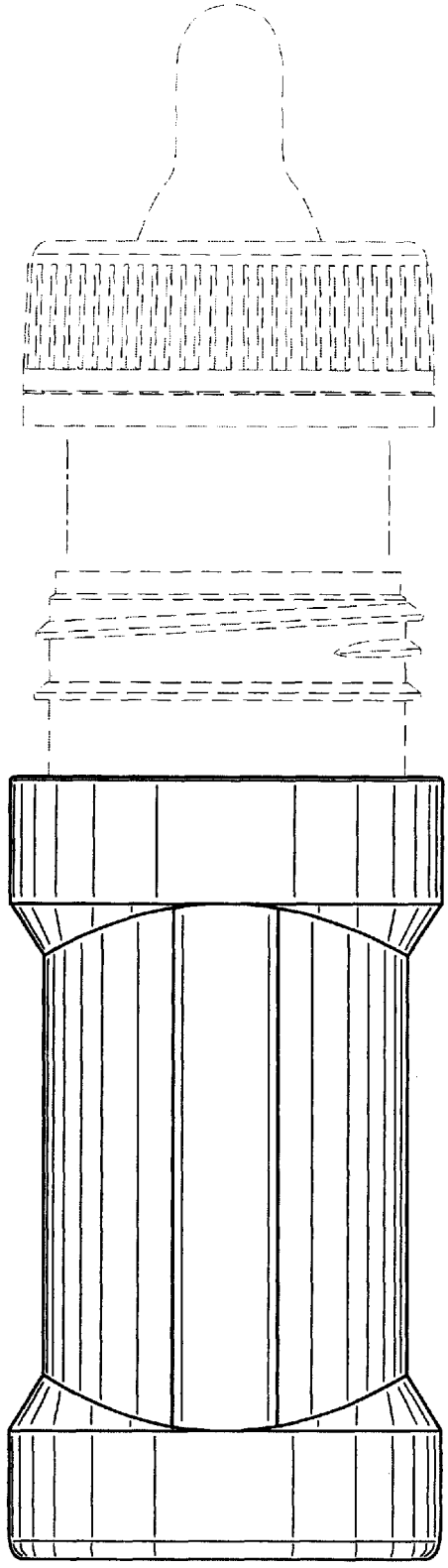
FIG. 3 is a rear elevational view of the baby bottle illustrated in FIG. 1.
Figure 4:
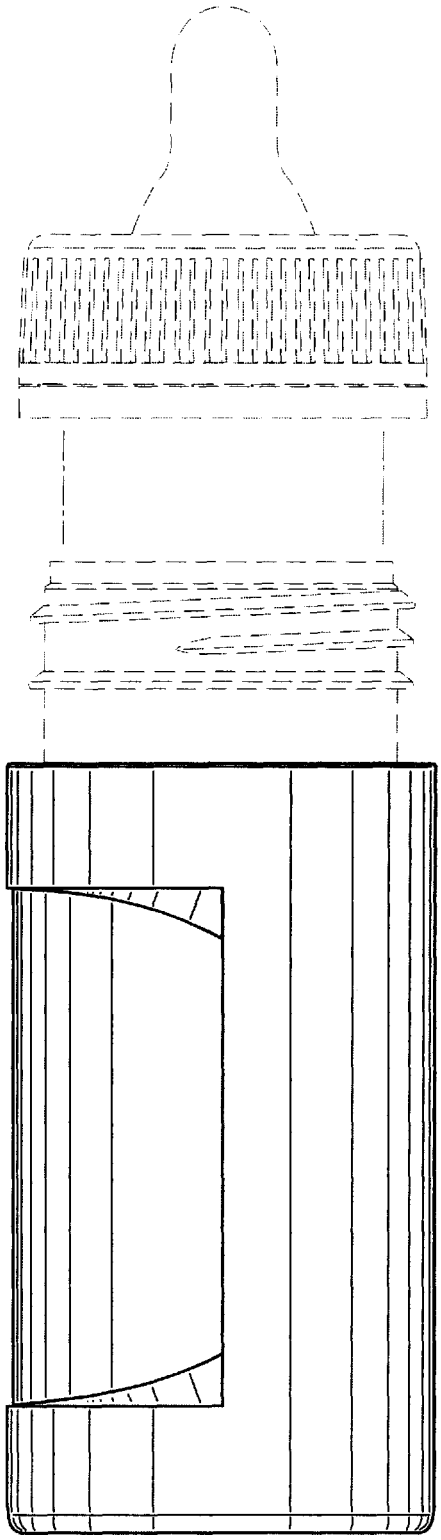
FIG. 4 is a right side elevational view of the baby bottle illustrated in FIG. 1.
Figure 5:
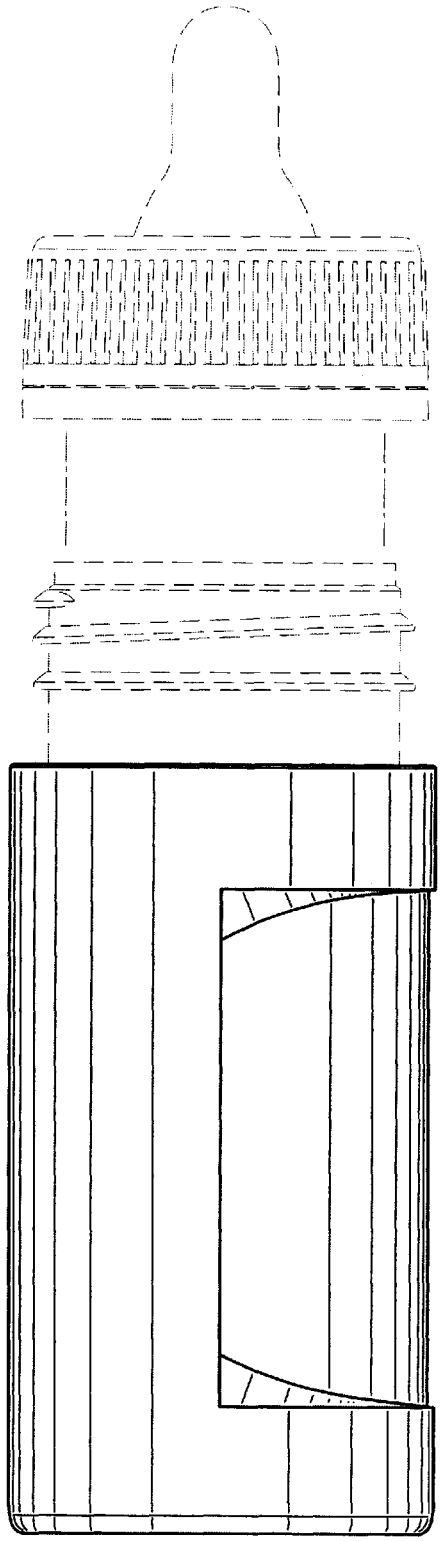
FIG. 5 is a left side elevational view of the baby bottle illustrated in FIG. 1.
Figure 6:
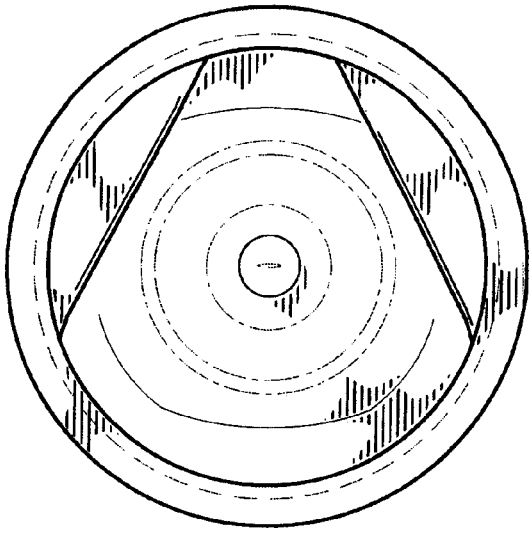
FIG. 6 is a top view of the baby bottle illustrated in FIG. 1.
Figure 7:
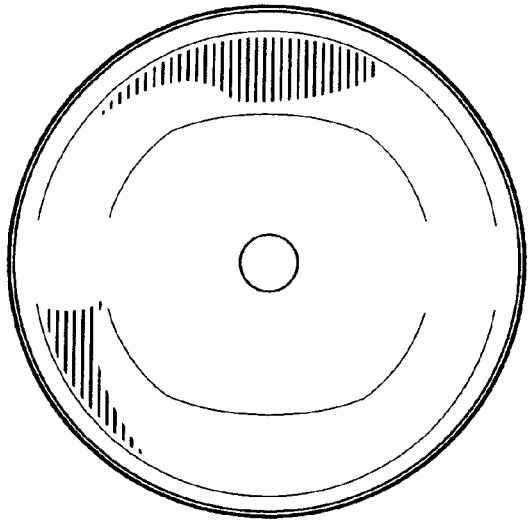
FIG. 7 is a bottom view of the baby bottle illustrated in FIG. 1.

The broken line showing the threaded top, nipple and cap is being shown for illustrative purposes only and forms no part of the claimed design.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | | |
|---|---|---|---|---|---|
| 3,804,952 | A | | 4/1974 | MacDonald | 215/11.1 X |
| 3,838,784 | A | | 10/1974 | Barton et al. | 215/11.1 |
| 4,676,387 | A | | 6/1987 | Stephenson et al. | 215/11 R |
| 4,703,863 | A | | 11/1987 | Kohus | 215/11.1 |
| 4,815,615 | A | * | 3/1989 | Phlaphongphanich | 215/11.1 |
| D335,450 | S | | 5/1993 | Pezzoli et al. | D9/500 |
| D337,271 | S | | 7/1993 | Pezzoli et al. | D9/503 |
| 5,263,599 | A | | 11/1993 | Sklar | 215/11.1 |
| 5,316,160 | A | | 5/1994 | Cautereels | 215/11.1 |
| D356,160 | S | | 3/1995 | Cautereels | D24/197 |
| D368,138 | S | * | 3/1996 | Hamilton | D24/197 |
| 5,531,338 | A | | 7/1996 | Sklar | 215/11.1 |
| D376,431 | S | * | 12/1996 | Roach | D24/197 |
| 5,765,704 | A | * | 6/1998 | Cameron | 215/11.6 |
| 5,807,156 | A | | 9/1998 | Owen | 446/77 |
| D401,345 | S | * | 11/1998 | Landgrebe | D24/199 |
| D404,822 | S | * | 1/1999 | Galustyan | D24/197 |
| D420,448 | S | | 2/2000 | Brown et al. | D24/197 |
| D423,107 | S | * | 4/2000 | Brown et al. | D24/197 |
| 6,244,452 | B1 | * | 6/2001 | Morano et al. | 215/11.6 |
| D460,825 | S | * | 7/2002 | Renz | D24/199 |
| D462,270 | S | * | 9/2002 | Renz | D9/537 |
| 6,708,833 | B2 | * | 3/2004 | Kolb | 215/11.1 |
| 6,722,514 | B2 | * | 4/2004 | Renz | 215/384 |
| 6,786,344 | B2 | | 9/2004 | Kipperman et al. | 215/11.1 |
| D511,836 | S | * | 11/2005 | Morano et al. | D24/197 |
| 6,978,908 | B2 | * | 12/2005 | Morano et al. | 215/396 |

* cited by examiner